United States Patent Office 3,232,929
Patented Feb. 1, 1966

3,232,929
PROCESS FOR PRODUCING XANTHOMONAS
HYDROPHILIC COLLOID
William H. McNeely, 5343 W. Fall View Drive, San Diego, Calif., and John J. O'Connell, 4951 Art St., San Diego 15, Calif.
No Drawing. Filed May 25, 1960, Ser. No. 31,510
5 Claims. (Cl. 260—209)

This invention relates to valuable improvements in methods of obtaining Xanthomonas hydrophilic colloid.

The invention relates particularly to an improved method of recovery of Xanthomonas hydrophilic colloid from the clarified fermentation liquor wherein the aforesaid colloid was produced biosynthetically.

It is known that Xanthomonas hydrophilic colloid can be produced by transferring the bacterium *Xanthomonas campestris*, to a suitable medium and conditioning it to vigorous growth through two stages before allowing it to grow in a final medium containing 3% glucose. After 96 hours at 30° C. with suitable aeration and stirring the aforementioned colloid will be produced in approximately 1% concentration. The viscosity is normally quite high so that the medium must be diluted to much lower concentrations in order that the insoluble materials therein contained may be removed. The known methods of preparation have called for a dilution to 0.6% colloid concentration or less, and centrifugation as a means of clarification. To recover the colloid in solid form has required precipitation with a water miscible solvent (for example, methanol) in which the colloid is insoluble. This requires very large ratios of solvent to colloid. Even with a good solvent recovery system, the minor losses to be expected make the process very costly. The clarification also would be faster and less expensive if it were possible to dilute the fermentation liquor to much lower concentrations (lower viscosities). However, the solvent costs would be multiplied to an impractical point were this dilution substantial.

Means other than using solvents for precipitating the colloid have seemed non-existent. The pure colloid has excellent compatibilities with salts of the common cations (sodium, potassium, ammonium, calcium, magnesium, aluminum, etc.). It is not precipitated by acids such as hydrochloric, sulfuric, phosphoric or acetic, nor by alkalies such as sodium, potassium or ammonium hydroxide. It is, thus, surprising that where neither calcium salts or alkalies cause precipitation by themselves, by our invention the material precipitates with a combination of calcium and alkali. The precipitation is relatively unchanged by dilution within the useful range. Thus, the materials needed to recover a given weight of colloid from a 0.2% concentration are not substantially different than those needed in the case of a 0.6% concentration. Solvent requirements by the known method would be tripled at 0.2% compared to 0.6%. The costs of the materials from the alkaline calcium precipitation are a small fraction of those by the solvent procedure.

Yet another advantage is found in our discovery. The precipitation can be arranged so that fibers of colloid result which are particularly suited to washing, extraction, dewatering or other treatments. Machinery for handling such a material in a continuous process is simple in design and relatively inexpensive.

As the second part of our invention for the recovery, these precipitated fibers can be recovered in different ways to give the soluble colloid.

One method that we have found is to neutralize the fibers (pressed to about 30% solids) with an acid, and dry the material. This produces soluble colloid containing a calcium salt. To avoid a hygroscopic nature one may choose to make the calcium salt an insoluble one (example, calcium sulfate). For some usese the product can be used directly. For others, if a calcium salt is chosen which has solvent solubility or partial solubility (example, calcium acetate) the dried product can then be extracted with the solvent to remove the salt.

Another method is to suspend the pressed fibers in a water-miscible alcohol and neutralize the material with a suitable acid having solubility in the alcohol, such as hydrochloric acid. The resulting calcium salt, e.g., calcium chloride, is then extracted with an organic solvent in which the calcium salt is soluble.

Yet a third procedure that we have invented is to place the fibers in alcohol containing sufficient HCl to make the mix acidic, press out the fluid, wash with more alcohol and then neutralize with a base of the cation desired to be attached to the carboxyls of the colloid.

The Xanthomonas hydrophilic colloid that is contemplated in our invention is a colloid prepared by the bacterium *Xanthomonas campestris*. This high molecular weight, exocellular material is a polymer comprising mannose, glucose and potassium glucuronate units.

In preparing the said colloid as aforesaid, it is convenient to use corn steep liquor or distillers' dry solubles as an organic nitrogen source. It is expedient to grow the culture in two intermediate stages prior to the final inoculation in order to encourage vigorous growth of the bacteria. These stages may be carried out in media having a pH of about 7. In a first stage a transfer from an agar slant to a dilute glucose broth may be made and the bacteria cultured for 24 hours under vigorous agitation and aeration at a temperature of about 30° C. The culture so produced may then be used to inoculate a higher glucose (3%) content broth of larger volume in a second intermediate stage. In this stage the reaction may be permited to continue for 24 hours under the same conditions as the first stage. The culture so acclimated for use with glucose by the aforementioned first and second stages is then added to the final glucose medium. In the aforesaid method of preparing *Xanthomonas compestris* hydrophilic colloid, a loopful of organism from the agar slant is adequate for the first stage comprising 200 milliliters of the said glucose media. The second stage comprised the material resulting from the first stage together with 9 times its volume of a 3% glucose media. In the final stage the material produced in the second stage was admixed with 19 times its volume of the final media. The final media contained 3% glucose, 0.5% distillers' dry soluble, 0.5% dipotassium phosphate, 0.1% magnesium sulphate having 7 molecules of water of crystallization and water. The reaction in the final stage was carried out for 96 hours at 30° C. with vigorous agitation and aeration.

By the known solvent method the mixture is then diluted with an equal amount of water and methanol to give 24.7% methanol by weight in the mixture. It is centrifuged twice and the methanol increased to 56%.

The precipitate is recovered, redissolved and retreated once more. The fibers obtained the second time are hardened in approximately 5 volumes of methanol, dried and milled. In all, methanol in excess of 400 parts per part of colloid is used by this procedure, which is costly in both materials and equipment. On the other hand, by proceeding in accordance with our invention, the mixture obtained after the 96 hours fermentation is diluted with 5 volumes of water and then centrifuged. The centrifuging thus produces a clarified liquor much more readily. It is then precipitated by hydrated lime. As an illustration of this procedure we give the following:

EXAMPLE A

*Precipitation process*

To a slurry of 20 pounds of hydrated lime in 200 pounds of water add, in a thin stream, clarified fermented liquor which contains 10 pounds of Xanthomonas hydrophilic colloid at approximately 0.2% concentration. Stir the mixture slowly during the addition. Pass the slurry over a screen, and dewater the fibers which are separated in a press.

The moisture content of these fibers varies with the means of dewatering. We have worked with fibers having a moisture content of approximately 70%.

By this invention these fibers may be used in the form just obtained, or, preferably, they may be further treated. We now give three basic methods within the broad scope of our invention for reconstituting the fibers to a water-soluble form where this is desired:

EXAMPLE I

*Neutralization*

Place the precipitated and dewatered fibers from Example A in a heavy duty mixer so that 10 pounds of Xanthomonas hydrophilic colloid is therein. Add sulfuric acid until the mix remains at a neutral pH. Dry the resulting paste in thin sheets and mill it.

Such a product contains calcium sulfate, and the soluble colloid. It can be used in applications where calcium sulfate is acceptable.

The sulfuric acid can be replaced by other acids, such as hydrochloric acid, phosphoric acid, carbonic acid or acetic acid on an equivalent basis, and the corresponding calcium salt of the acid used is formed.

EXAMPLE II

*Neutralization and extraction*

Place the precipitated and dewatered fibers from Example A in a heavy duty mixer so that 10 pounds of Xanthomonas hydrophilic colloid is therein. Add acetic acid until the pH remains neutral. Dry the resulting paste in thin sheets and mill to a powder. Extract the powder in methanol in a Soxhlet type of extractor until it is essentially free of acetate salt.

The acetic acid can be replaced by other acids, such as hydrochloric acid on an equivalent basis, the alternative acid being chosen so as to give a calcium salt which is soluble in the organic solvent used to remove it, such as for example, methanol, ethanol, and the like.

EXAMPLE III

*Acidic solvent wash and neutralization*

To a heavy duty mixer add 65 pounds of methanol and 60 pounds of 37% HCl, and to this add the fibers from Example A so that 10 pounds of Xanthomonas hydrophilic colloid is present. Mix for 20 minutes and press out the fibers. Wash the fibers in 2 baths containing a mixture of 30 pounds of methanol and 25 pounds of water. Suspend the fibers in 25 pounds of methanol and 25 pounds of water and add a 4 normal solution of potassium hydroxide until the fibers are neutralized. Press the liquid from the fibers. Dry the fibers and mill them.

We have found that to have the carboxyls of the colloid neutralized with a cation other than potassium, the base of the cation desired should be substituted in place of the potassium hydroxide in Example III. Thus, sodium hydroxide, lithium hydroxide, and the like may be used, as desired.

We have also found that the acid-washed fibers need not be suspended in methanol for the potassium hydroxide neutralization whenever equipment is available that can dry the resulting paste satisfactorily.

In Examples II and III we have found that the methanol can be replaced by ethanol, isopropanol or acetone.

In Example II, extractors other than the Soxhlet type can be used and in some of these it is advantageous to use some water in the methanol to increase the salt solubility and the penetration of the powder particles.

The water-soluble product obtained by proceeding in accordance with our invention, as set forth in Examples I, II and III, may be used for a wide variety of purposes. For example, they may be used to increase the foam in carbonated beverages, such as beer, root beer, cream soda and the like. They may be used as additives to drilling muds, both as thickening and suspending agents, and particularly as concerns the fibrous precipitate which is the primary product as obtained for example, in Example A, for overcoming lost circulation in drilling through fractured strata. The products obtained in accordance with our invention are suitable for a wide variety of ceramic uses, such as for suspending enamel frits. They have great utility for foods, such as for example, suspending particulate food in a gelatinous matrix, as for example, in aspic, jellied fruit desserts, canned sea food, and the like. They also are useful as fortifying agents for candies, jams and jellies and as thickening and smoothing agents for certain dairy products, such as process cheese and ice cream. They may be used as a size for paper and textiles and are even capable of being spun into textile fibers themselves by suitable treatments.

For convenience the disclosure and the claims which follow utilize the term "hydrated lime." It will be evident to those skilled in the art that quicklime or slaked lime may be the starting material, since as soon as quicklime is slurried in water, the quicklime becomes hydrated lime.

The relative proportions of reactants are not especially critical, and in general are dictated primarily by good plant practice. For example, if in the process set forth in Example A too little hydrated lime were used, some precipitate would be obtained, but the remainder of the Xanthomonas colloid would simply be wasted. On the other hand, it would be pointless to use a great excess of hydrated lime as this would simply load the precipitate obtained with "dead weight" in the form of hydrated lime.

It will be understood, accordingly, that while exemplary proportions and starting materials and reactants have been given in order to elucidate the invention, the scope of the latter is broad and many permutations, substitutions, changes in temperature and like working conditions may be used while still proceeding in accordance with our invention, all within the scope of the claims which follow.

Having described our invention, we claim:

1. A process of preparing a water-soluble Xanthomonas colloid from an aqueous dispersion of a Xanthomonas colloid which comprises: preparing a slurry of hydrated lime in water; admixing said dispersion with said slurry; recovering the fibrous precipitate which forms; admixing said precipitate with a solution of water-miscible organic solvent and an acid which is soluble in said organic solvent and whole calcium salt is soluble in said organic solvent; subsequently separating the Xanthomonas colloid so obtained from said organic solvent and said acid solution; and thereafter neutralizing said Xanthomonas colloid with a base.

2. The process of claim 1 wherein the acid is hydrochloric acid and the base is chosen from the group consisting of potassium hydroxide, potassium carbonate, sodium hydroxide, sodium carbonate and ammonium hydroxide.

3. The process of claim 1 wherein the acid is hydrochloric acid, the base is chosen from the group consisting of potassium hydroxide, potassium carbonate, sodium hydroxide, sodium carbonate and ammonium hydroxide, and the organic solvent is chosen from the group consisting of methanol, ethanol isopropanol, and acetone.

4. The process of claim 1 wherein the acid is hydrochloric acid, the base is sodium hydroxide, and the water-miscible solvent is methanol.

5. The process of claim 1 wherein the acid is hydrochloric acid, the base is potassium hydroxide, and the water-miscible solvent is methanol.

References Cited by the Examiner
UNITED STATES PATENTS

| | | | |
|---|---|---|---|
| 2,685,579 | 8/1954 | Wimmer | 195—31 |
| 2,686,777 | 8/1954 | Wimmer | 195—31 |
| 3,020,206 | 2/1962 | Patton et al. | 252—8.55 |

OTHER REFERENCES

Weiser: "Colloid Chemistry," Second Ed., pub. by John Willey and Sons, Inc. (New York), 1949, pages 293–4.

U.S. Department of Agriculture, Agricultural Research Service, Northern Utilization Research and Development Division, Peoria, Illinois, September 1959, 3 pages, Bulletin CA–N–9.

JULIUS GREENWALD, *Primary Examiner.*

ALBERT T. MEYERS, *Examiner.*